United States Patent
Yorozu

(10) Patent No.: US 9,385,604 B2
(45) Date of Patent: Jul. 5, 2016

(54) DC/DC CONVERTER, SWITCHING POWER SUPPLY DEVICE, AND ELECTRONIC APPARATUS

(71) Applicant: Yasuaki Yorozu, Kanagawa (JP)

(72) Inventor: Yasuaki Yorozu, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 11 days.

(21) Appl. No.: 14/574,602

(22) Filed: Dec. 18, 2014

(65) Prior Publication Data

US 2015/0188427 A1 Jul. 2, 2015

(30) Foreign Application Priority Data

Dec. 27, 2013 (JP) .................................. 2013-272913

(51) Int. Cl.
*H02M 3/158* (2006.01)

(52) U.S. Cl.
CPC ............ *H02M 3/158* (2013.01); *H02M 3/1584* (2013.01)

(58) Field of Classification Search
CPC ....... H02J 1/102; H02M 3/1584; H02M 7/49; H02M 7/493
USPC .................................... 363/65, 71, 72, 95, 97
See application file for complete search history.

(56) References Cited

U.S. PATENT DOCUMENTS

| | | | |
|---|---|---|---|
| 2007/0076453 A1 | 4/2007 | Schultz et al. | |
| 2010/0185841 A1 | 7/2010 | Monreal | |
| 2010/0201405 A1 | 8/2010 | Ahmad et al. | |
| 2011/0133553 A1* | 6/2011 | Bui .................... | H02M 3/158 307/31 |
| 2011/0169471 A1 | 7/2011 | Nagasawa | |
| 2012/0284441 A1 | 11/2012 | Landman et al. | |
| 2013/0088899 A1 | 4/2013 | Iwata | |
| 2013/0141952 A1* | 6/2013 | Kaneko ................. | H02M 7/537 363/72 |
| 2014/0056037 A1* | 2/2014 | Iijima ................. | H02M 3/1584 363/21.17 |
| 2015/0188406 A1* | 7/2015 | Nishi ................... | H02M 3/1584 323/217 |

FOREIGN PATENT DOCUMENTS

| | | |
|---|---|---|
| EP | 2154831 A1 | 2/2010 |
| EP | 2521041 A2 | 11/2012 |
| JP | 2011-147269 | 7/2011 |
| JP | 2012-010420 | 1/2012 |
| WO | WO99/14720 | 3/1999 |

OTHER PUBLICATIONS

U.S. Appl. No. 14/574,579, filed Dec. 18, 2014, Ryohsuke Nishi, et al.
European search report dated Oct. 23, 2015 in corresponding European Patent Application No. 14198975.6.

* cited by examiner

*Primary Examiner* — Adolf Berhane
(74) *Attorney, Agent, or Firm* — Cooper & Dunham LLP

(57) ABSTRACT

Provided is a DC/DC converter for a switching power supply device including a plurality of DC/DC converters which include a master DC/DC converter and a plurality of slave DC/DC converters and have output terminals connected in parallel to each other. The DC/DC converter includes: first and second terminals that are used to cascade the plurality of DC/DC converters in a line; a control circuit that determines that a host DC/DC converter is the master DC/DC converter when a predetermined voltage is detected at the second terminal and determines that the host DC/DC converter is the slave DC/DC converter when the predetermined voltage is not detected; and that controls a current output from the second terminal based on whether the host DC/DC converter is the master DC/DC converter or the slave DC/DC converter.

6 Claims, 12 Drawing Sheets

FIG. 12

| OPERATING STATE OR STOP STATE | | | | CURRENT DETECTED AT TERMINAL Isink IN EACH CONVERTER | | | |
|---|---|---|---|---|---|---|---|
| CONVERTER 3A | CONVERTER 3 | CONVERTER 2 | CONVERTER 1 | CONVERTER 3A | CONVERTER 3 | CONVERTER 2 | CONVERTER 1 |
| STOP | STOP | STOP | OPERATING | 0 μA | 5 μA | 15 μA | 30 μA |
| OPERATING | STOP | STOP | OPERATING | 0 μA | 10 μA | 20 μA | 35 μA |
| OPERATING | OPERATING | STOP | OPERATING | 0 μA | 10 μA | 25 μA | 40 μA |
| OPERATING | OPERATING | OPERATING | OPERATING | 0 μA | 10 μA | 25 μA | 45 μA |

DC/DC CONVERTER, SWITCHING POWER SUPPLY DEVICE, AND ELECTRONIC APPARATUS

CROSS-REFERENCE TO RELATED APPLICATIONS

This patent application is based on and claims priority pursuant to 35 U.S.C. §119 to Japanese Patent Application No. 2013-272913, filed on Dec. 27, 2013, in the Japan Patent Office, the entire disclosure of which is hereby incorporated by reference herein.

BACKGROUND

1. Technical Field

The present invention relates to a DC/DC converter, a switching power supply device including a plurality of DC/DC converters, and an electronic apparatus using the switching power supply device.

2. Description of the Related Art

With an increase in performance and functionality of mobile devices, a reduction in size and an increase in power capacity of the mobile devices are required. In order to meet the requirements, a DC/DC converter which is provided in the mobile devices needs to have a smaller size, high power capacity, and high efficiency.

In view of the above, a multi-phase power supply technique has been already known in which a plurality of converters are connected in parallel to each other. According to a switching power supply device using the multi-phase power supply technique, a plurality of DC/DC converters are connected in parallel to each other and a predetermined phase difference is given to the switching operations of the DC/DC converters to synchronize the DC/DC converters. The output currents from the plurality of DC/DC converters are combined to reduce a ripple. The technique has an advantage that it is not necessary to use a large passive element in order to form a filter provided in an output unit of the switching power supply device. In addition, the amount of current which flows to each DC/DC converter is less than that when the switching power supply device includes a single DC/DC converter. Therefore, the technique also has an advantage that heat which is generated from each DC/DC converter due to the loss of circuits is reduced and the radiation performance requirements of each DC/DC converter are relaxed. These advantages make it easy to reduce the size of the switching power supply device. In addition, when the power consumption of a load device is small, some of the DC/DC converters are stopped to improve the power conversion efficiency of the entire switching power supply device.

However, in the related art, a dedicated controller needs to be separately used in order to implement the function of the multi-phase power supply. The controller adjusts the output currents from a plurality of DC/DC converters so as to be equal to each other, adjusts the switching time between the DC/DC converters, or stops some of the plurality of DC/DC converters which are connected to each other when the load is small. However, in this case, the number of components increases and wiring between the DC/DC converters and the controller becomes complicated. As a result, the size of the device increases according to circumstances. Therefore, the multi-phase power supply technique is used for a high-capacity power supply device with an output current of several tens of amperes or more and is not capable of being applied as a power supply for a small mobile device with an output current of about several amperes.

In addition, the multi-phase power supply technique according to the related art has the problems that it is difficult to arbitrarily change the number of parallel circuits and to dynamically change the number of parallel operations (the number of phases) depending on a load.

For example, when the switching power supply device is a switching power supply device for a mobile apparatus, it is assumed that the functions of the DC/DC converter is mounted as an integrated circuit (IC). In this case, it is necessary to minimize the number of IC terminals which are additionally required, in order to add a multi-phase function to the converter. For example. in general, a step-down DC/DC convener with an output current of 1 A has a package size of about 2 mm×2 mm and has eight terminals. When the number of terminals increases due to the addition of the multi-phase function, it is necessary to increase the package size, which results in an increase in mounting area.

SUMMARY

An object of the invention is to provide a DC/DC converter for a switching power supply device which does not require a separate controller in order to implement the functions of a multi-phase power supply device, can arbitrarily change the number of converters that are connected in parallel to each other, can dynamically change the number of converters that operate in parallel (the number of operating phases), and can reduce the number of terminals required to add a multi-phase power supply function when the DC/DC converter is mounted as, for example, an IC.

According to an aspect of the invention, there is provided a DC/IDC converter for a switching power supply device including a plurality of DC/DC converters which include a master DC/DC converter and a plurality of slave DC/DC converters and have output terminals connected in parallel to each other. The DC/DC converter includes: first and second terminals that are used to cascade the plurality of DC/DC converters in a line: a control circuit that determines that a host DC/DC converter is the master DC/DC converter when a predetermined voltage is detected at the second terminal and determines that the host DC/DC converter is the slave DC/DC converter when the predetermined voltage is not detected; and controls a current output from the second terminal on the basis of whether the host DC/DC converter is the master DC/DC converter or the slave DC/DC converter. The first terminal of the slave DC/DC converter which is far from the master DC/DC converter is grounded. (1) When the host DC/DC converter is determined to be the slave DC/DC converter, the control circuit detects a current value of a current which flows from the first terminal; and adds a predetermined addition current value to the detected current value and outputs a current with the sum of the current values through the second terminal if the host DC/DC converter is operating, or outputs the current with the detected current value through the second terminal if the host DC/DC converter does not operate, and (2) when the host DC/DC converter is determined to be the master DC/DC converter, the control circuit divides the detected current value by the addition current value, detects the number of converters which are operating based on the divided value, and transmits information indicating the detected number of operating converters to the slave DC/DC converter.

According to an aspect of the invention, there is provided a DC/DC converter for a switching power supply device including a plurality of DC/DC converters which include a master DC/DC converter and a plurality of slave DC/DC converters and have output terminals connected in parallel to each other. The DC/DC converter includes: first and second terminals that are used to cascade the plurality of DC/DC converters in a line; a control circuit that determines that a host DC/DC converter is the master DC/DC converter when a predetermined voltage is detected at the second terminal and determines that the host DC/DC converter is the slave DC/DC converter when the predetermined voltage is not detected, and controls a current output from the second terminal based on whether the host DC/DC converter is the master DC/DC converter or the slave DC/DC converter. A predetermined initial current value is supplied to the first terminal of the slave DC/DC converter which is far from the master DC/DC. (1) When the host DC/DC converter is determined to be the slave DC/DC converter, the control circuit detects a current value of a current which flows from the first terminal; and subtracts the initial current value from the detected current value, adds a predetermined addition current value to the subtraction result, and outputs a current with the sum of the current values through the second terminal if the host DC/DC converter is operating, or outputs the current with the detected current value through the second terminal if the host DC/DC converter does not operate, and (2) when the host DC/DC converter is determined to be the master DC/DC converter, the control circuit divides the detected current value by the addition current value, detects the number of converters which are operating based on the divided value, and transmits information indicating the detected number of operating converters to the slave DC/DC converter.

According to an aspect of the invention, there is provided a DC/DC converter for a switching power supply device including a plurality of DC/DC converters which include a master DC/DC converter and a plurality of slave DC/DC converters and have output terminals connected in parallel to each other. The DC/DC converter includes: first and second terminals that are used to cascade the plurality of DC/DC converters in a line; a control circuit that determines that a host DC/DC converter is the master DC/DC converter when a predetermined voltage is detected at the second terminal and determines that the host DC/DC converter is the slave DC/DC converter when the predetermined voltage is not detected, and that controls a current output from the second terminal based on whether the host DC/DC converter is the master DC/DC converter or the slave DC/DC converter. The first terminal of the slave DC/DC converter which is far from the master DC/DC converter is grounded. The DC/DC converters are configured so as to sequentially operate from the slave DC/DC converter which is far from the master DC/DC converter. A predetermined initial current value is supplied to the first terminal of the slave DC/DC converter which is far from the master DC/DC. (1) When the host DC/DC converter is determined to be the slave DC/DC converter, the control circuit detects a current value of a current which flows from the first terminal; and subtracts the initial current value from the detected current value, adds a predetermined addition current value to the subtraction result, and outputs a current with the sum of the current values through the second terminal if the host DC/DC converter is operating, or outputs the current with the detected current value through the second terminal if the host DC/DC converter does not operate, and (2) when the host DC/DC converter is determined to be the master DC/DC converter, the control circuit divides the detected current value by the addition current value, detects the number of converters which are operating based on the divided value, and transmits information indicating the detected number of operating converters to the slave DC/DC converter.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIG. 12 is a table illustrating currents which are detected at a terminal Isink in each of the DC/DC converters corresponding to the operating state or the stop state of each of the DC/DC converters shown in FIG. 9.

Figure 1:
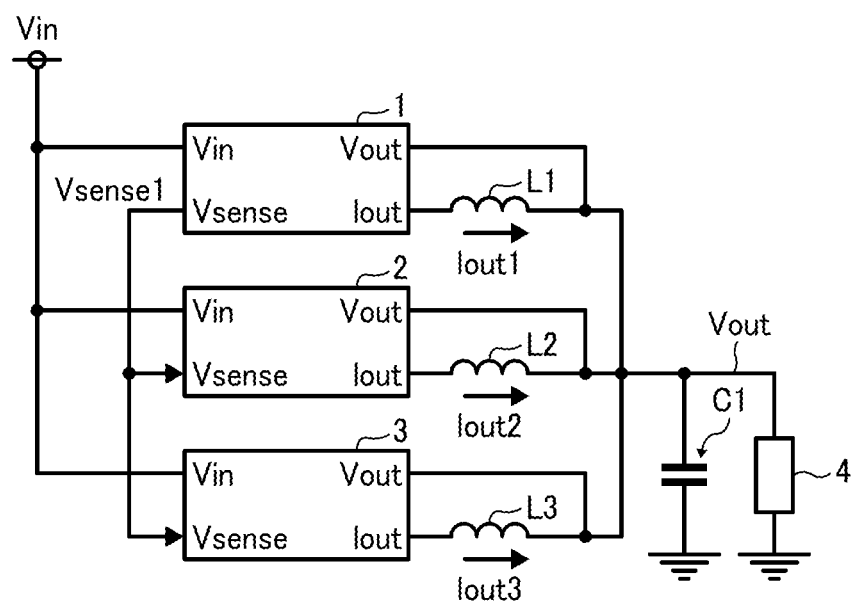
FIG. 1 is a block diagram illustrating the structure of a switching power supply device according to a first embodiment of the invention.

The accompanying drawings are intended to depict example embodiments of the present invention and should not be interpreted to limit the scope thereof. The accompanying drawings are not to be considered as drawn to scale unless explicitly noted.

DETAILED DESCRIPTION OF THE INVENTION

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the tennis "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that operate in a similar manner.

Hereinafter, switching power supply devices according to embodiments of the invention will be described in detail with reference to the drawings.

FIG. 1 is a block diagram illustrating the structure of a switching power supply device according to an embodiment of the invention. In FIG. 1, the switching power supply device includes a plurality of DC/DC converters (hereinafter, referred to as converters) 1 to 3 which are connected in parallel to each other, inductors L1 to L3, and a capacitor C1. The converters 1 to 3 include one master converter 1 that constantly generates an output current while the switching power supply device is operating and one or more slave converters 2 and 3 that operate in an operating state to generate the output current or in a stop state not to generate the output current while the switching power supply device is operating. The converters 1 to 3 acquire an input voltage Vin from a direct current (DC) voltage source and transmit output currents Iout1 to Iout3 to the capacitor C1 through the inductors L1 to L3, respectively. The inductors L1 to L3 and the capacitor C1 form a filter. The voltage which is smoothed by the filter is supplied as an output voltage Vout of the switching power supply device to a load device 4. In addition, the converters 1 to 3 monitor the magnitudes of the output currents Iout1 to Iout3 and also monitor the output voltage Vout of the switching power supply device. The converter 1 transmits a voltage signal Vsense1 indicating the magnitude of the output current of the converter 1 to the other converters 2 and 3. The slave converters 2 and 3 operate such that the output currents Iout2 and Iout3 thereof are equal to the output current Iout1 of the master converter 1. Therefore, the output currents Iout1 to Iout3 of all of the converters 1 to 3 are equal to each other.

Figure 2:
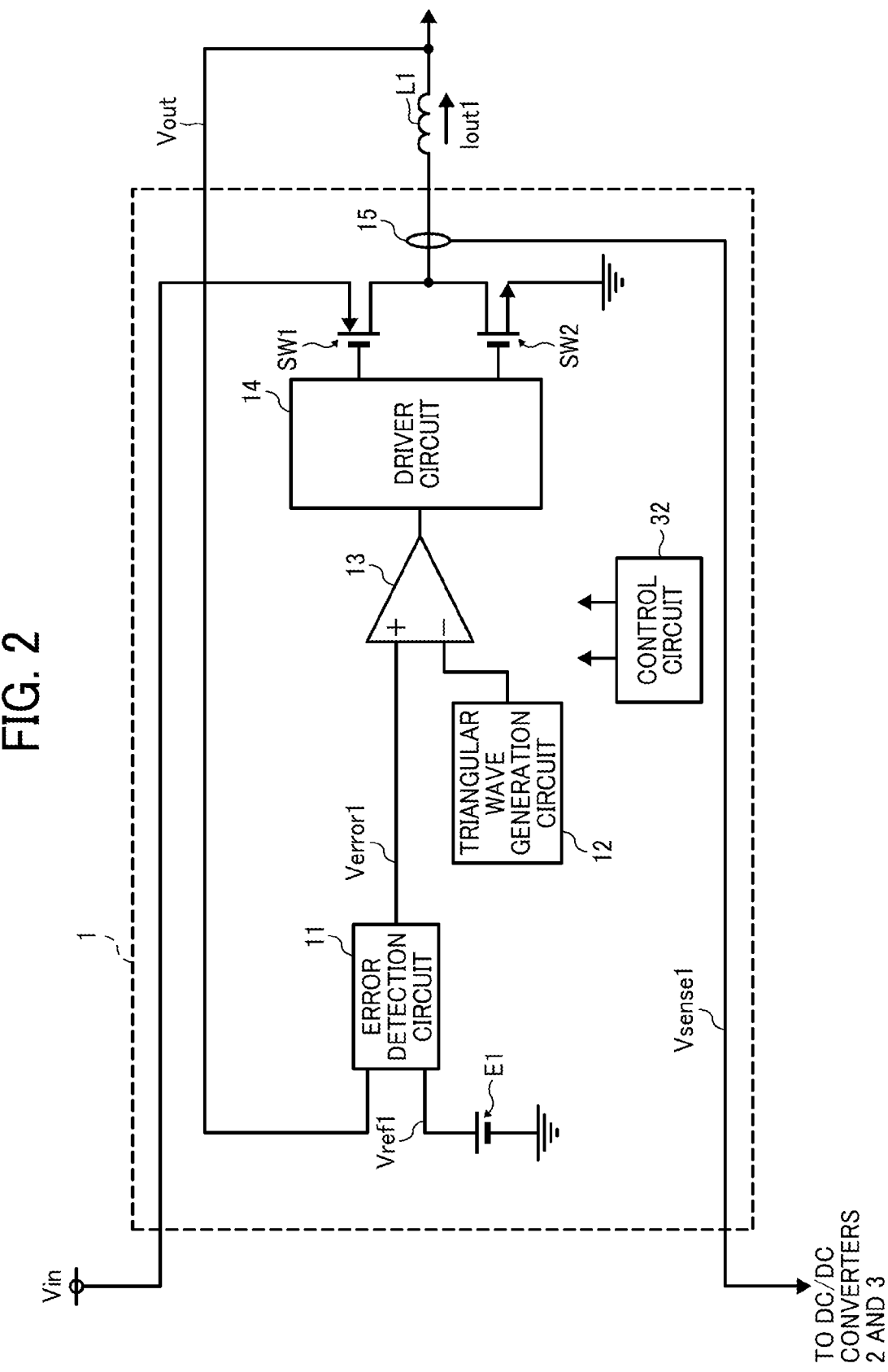
FIG. 2 is a block diagram illustrating the detailed structure of a DC/DC converter shown in FIG. 1.

FIG. 2 is a block diagram illustrating the detailed structure of the converter 1 illustrated in FIG. 1. In FIG. 2, the converter 1 includes a reference voltage source E1, an error detection circuit 1, a triangular wave generation circuit 12, a comparator 13, a driver circuit 14, switching elements SW1 and SW2, and a current sensor 15. The reference voltage source E1 generates a predetermined reference voltage Vref1, which is previously set. The error detection circuit 11 generates an error voltage Verror1 indicating a difference between the output voltage Vout of the switching power supply device and the reference voltage Vref1. The triangular wave generation circuit 12 generates a triangular wave with a predetermined frequency and amplitude. The comparator 13 compares the error voltage Verror1 with the triangular wave and transmits a signal indicating the comparison result to the driver circuit 14. The driver circuit 14 generates a pulse width modulation (PWM) signal and controls the turn-on and turn-off of the switching elements SW1 and SW2, Here, the switching element SW1 is a P-channel MOS transistor and the switching element SW2 is an N-channel MOS transistor. Therefore, the comparator 13 and the driver circuit 14 operate as a driving circuit which drives the switching elements SW1 and SW2 on the basis of the error voltage Verror1. The current sensor 15 detects the magnitude of the output current Iout1 of the converter 1 and converts the output current into the voltage signal Vsense1 with a voltage that is proportional to the output current value. The voltage signal Vsense1 is transmitted from the converter 1 to the other converters 2 and 3.

Figure 3:
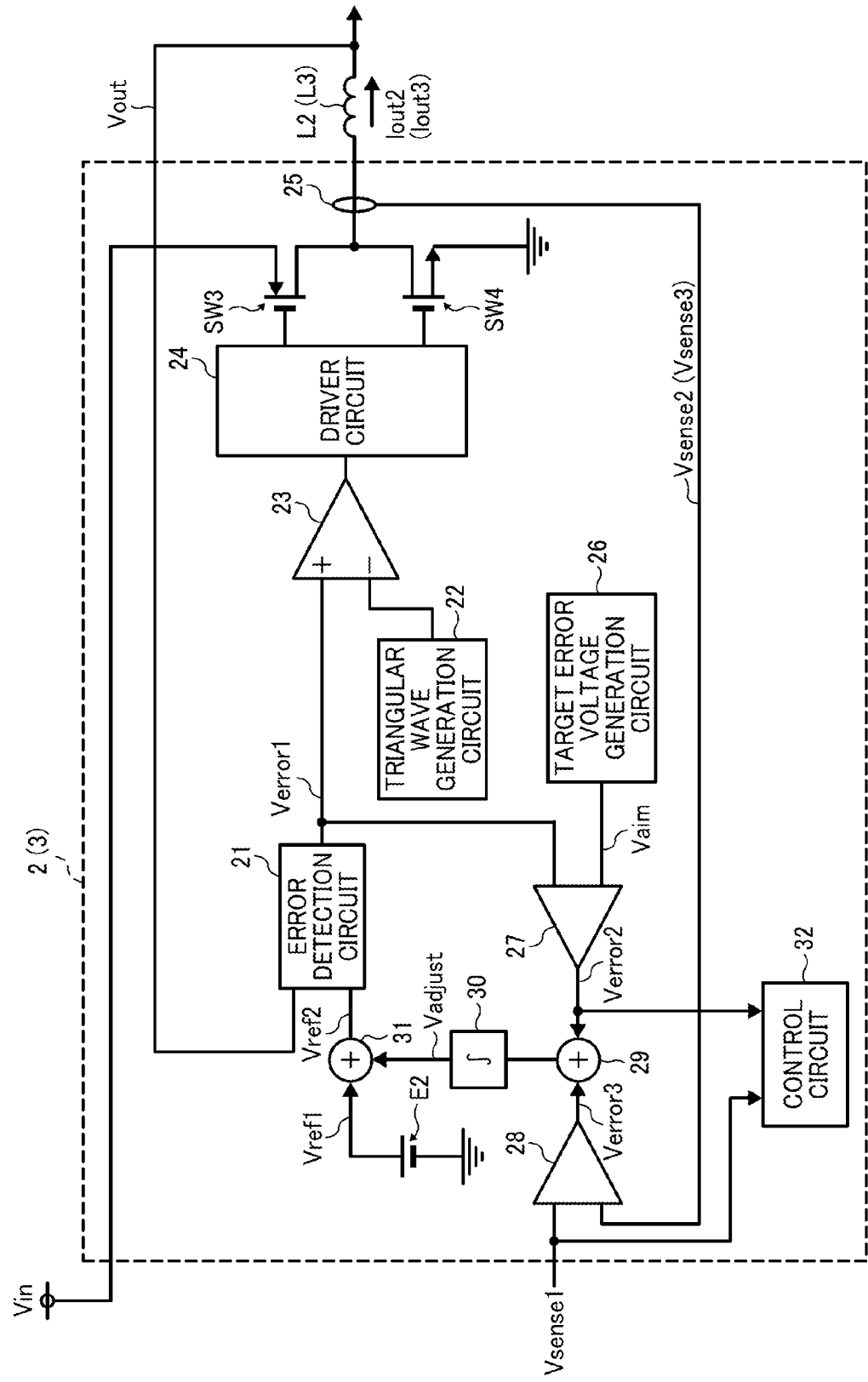
FIG. 3 is a block diagram illustrating the detailed structure of DC/DC converters other than the DC/DC converter of FIG. 2, shown in FIG. 1.

FIG. 3 is a block diagram illustrating the detailed structure of the converters 2 and 3 illustrated in FIG. 1. In FIG. 3, the converter 2 includes a reference voltage source E2, an error detection circuit 21, a triangular wave generation circuit 22, a comparator 23, a driver circuit 24, switching elements SW3 and SW4, and a current sensor 25. The components of the converter 2 have substantially the same structures as the components of the converter 1, with some differences. The reference voltage source E2 generates the same reference voltage value Vref1 as the reference voltage source E1 of the converter 1. The reference voltage Vref1 generated by the reference voltage source E2 is not input to the error detection circuit 21, but a reference voltage Vref2 obtained by adjusting the reference voltage Vref1 such that the output current Iout2 of the converter 2 is equal to the output current Iout1 of the converter 1 is input to the error detection circuit 21. The converter 2 further includes a target error voltage generation circuit 26, error detection circuits 27 and 28, adders 29 and 31, an integrator 30, and a control circuit 32.

In FIG. 3, the target error voltage generation circuit 26 generates a target error voltage Vaim which is a target value (an ideal value when the converter 2 is in the operating state) of the first error voltage Verror1 output from the error detection circuit 21. The error detection circuit 27 generates a second error voltage Verror2 indicating a difference between the first error voltage Verror1 and the target error voltage Vaim. The error detection circuit 28 generates a third error voltage Verror3 indicating a difference between the voltage signal Vsense1 indicating the magnitude of the output current Iout1 of the converter 1 and a voltage signal Vsense1 indicating the magnitude of the output current Iout2 of the converter 2. The control circuit 32 is a digital circuit and switches the converter 2 to the operating state or the stop state on the basis of the voltage signal Vsense1 and the second error voltage Verror2. When the converter 2 is in the operating state and the voltage signal Vsense1 is less than a predetermined threshold value, the control circuit 32 determines that the power consumption of the load device 4 has been reduced and switches the converter 2 to the stop state. When the converter 2 is in the stop state and the voltage signal Vsense1 is greater than the predetermined threshold value, the control circuit 32 determines that the power consumption of the load device 4 has increased and switches the converter 2 to the operating state. When the converter 2 is in the stop state and the second error voltage Verror2 is greater than a predetermined threshold value, the control circuit 32 determines that the power consumption of the load device 4 has increased and switches the converter 2 to the operating state. The control circuit 32 controls the turn-on and turn-off of each component of the converter 2 on the basis of whether the converter 2 is in the operating state or the stop state.

When the converter 2 is in the operating state, the operation of only the error detection circuit 27 and the target error voltage generation circuit 26 is stopped and the other components operate. Therefore, in this case, the third error voltage Verror3 is integrated by the integrator 30 and becomes a voltage adjustment value Vadjust. The sum of the reference voltage Vref1 and the voltage adjustment value Vadjust is input as the reference voltage Vref2 to the error detection circuit 21. In other words, when the converter 2 is in the operating state, the error detection circuit 21 uses the sum of the reference voltage Vref1 and the integrated third error voltage Verror3 as the reference voltage Vref2 of the error detection circuit 21.

On the other hand, when the converter 2 is in the stop state, only the error detection circuits 21 and 27, the target error voltage generation circuit 26, the adders 29 and 31, the integrator 30, the reference voltage source E2, and the control circuit 32 operate and the other components are stopped.

Therefore, in this case, the second error voltage Verror2 is integrated by the integrator 30 and becomes the voltage adjustment value Vadjust. The sum of the reference voltage Vref1 and the voltage adjustment value Vadjust is input as the reference voltage Vref2 to the error detection circuit 21. In other words, when the converter 2 is in the stop state, the error detection circuit 21 uses the sum of the reference voltage Vref1 and the integrated second error voltage Verror2 as the reference voltage of the error detection circuit 21.

The reference voltage Vref1 of the reference voltage source E2 in the converter 2 should be equal to the reference voltage Vref1 of the reference voltage source E1 in the converter 1, but is likely to have an error due to a variation in manufacture. Therefore, when the converter 2 is in the operating state, the reference voltage Vref1 of the reference voltage source E2 is adjusted on the basis of the third error voltage Verror3 such that the output current Iout2 of the converter 2 is equal to the output current Iout1 of the converter 1. When the converters 1 and 2 operate for a sufficiently long period of time and changes to a normal state, the reference voltage Vref2 obtained by adjusting the reference voltage Vref1 of the reference voltage source E2 in the converter 2 is equal to the reference voltage Vref1 of the reference voltage source E1 in the converter 1. In this case, the magnitudes of the output currents Iout1 and Iout2 which are respectively detected by the current sensors 15 and 25 of the converters 1 and 2 are equal to each other. However, the function of adjusting the error of the reference voltage Vref1 of the reference voltage source E2 is performed on the assumption that the converter 2 is in the operating state and the output current Iout2 is generated. Therefore, when the converter 2 is in the stop state, the output current Iout2 is zero and it is difficult to correct the error of the reference voltage Vref1 of the reference voltage source E2 on the basis of the third error voltage Verror3. Therefore, when the converter 2 is in the stop state, the reference voltage Vref1 of the reference voltage source E2 is adjusted on the basis of the second error voltage Verror2, instead of the third error voltage Verror3 (which will be described below).

The converter 3 has the same structure as the converter 2, such that description thereof is omitted.

Figure 4:
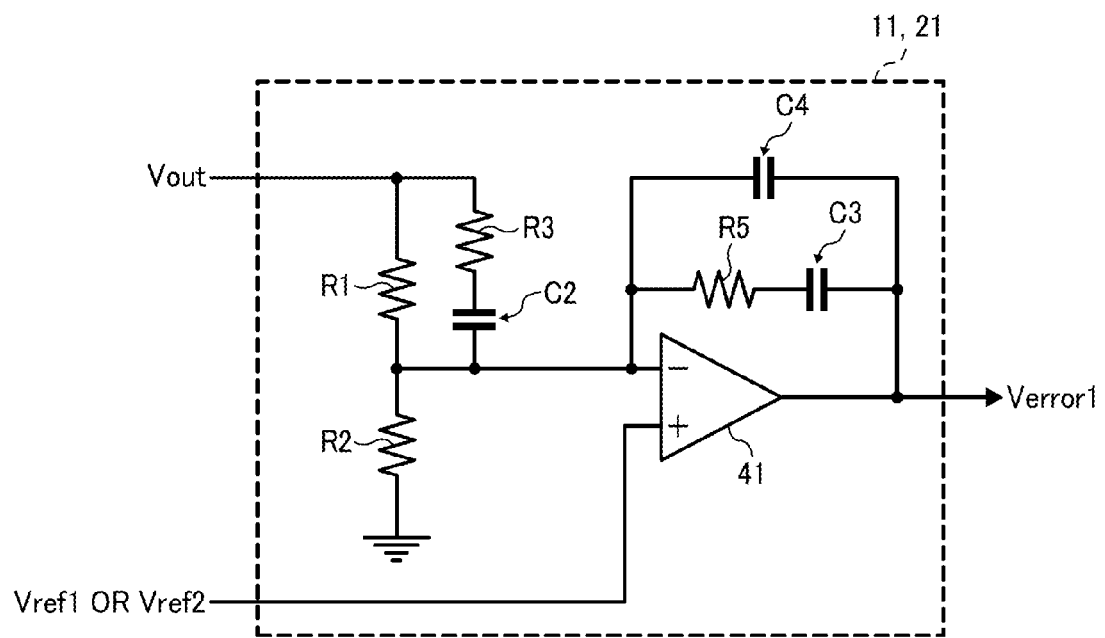
FIG. 4 is a circuit diagram illustrating the detailed structure of error detection circuits shown in FIGS. 2 and 3.

FIG. 4 is a circuit diagram illustrating the detailed structure of the error detection circuits 11 and 21 shown in FIGS. 2 and 3. In FIG. 4, the error detection circuit 11 or 21 includes a phase compensation circuit including resistors R1 to R5, capacitors C2 to C4, and an operational amplifier 41 and an integration circuit. The error detection circuit 11 or 21 detects the difference between the output voltage Vout of the switching power supply device and the reference voltage Vref1 or Vref2, amplifies the difference, and integrates the difference to generate the error voltage Verror1.

Figure 5:
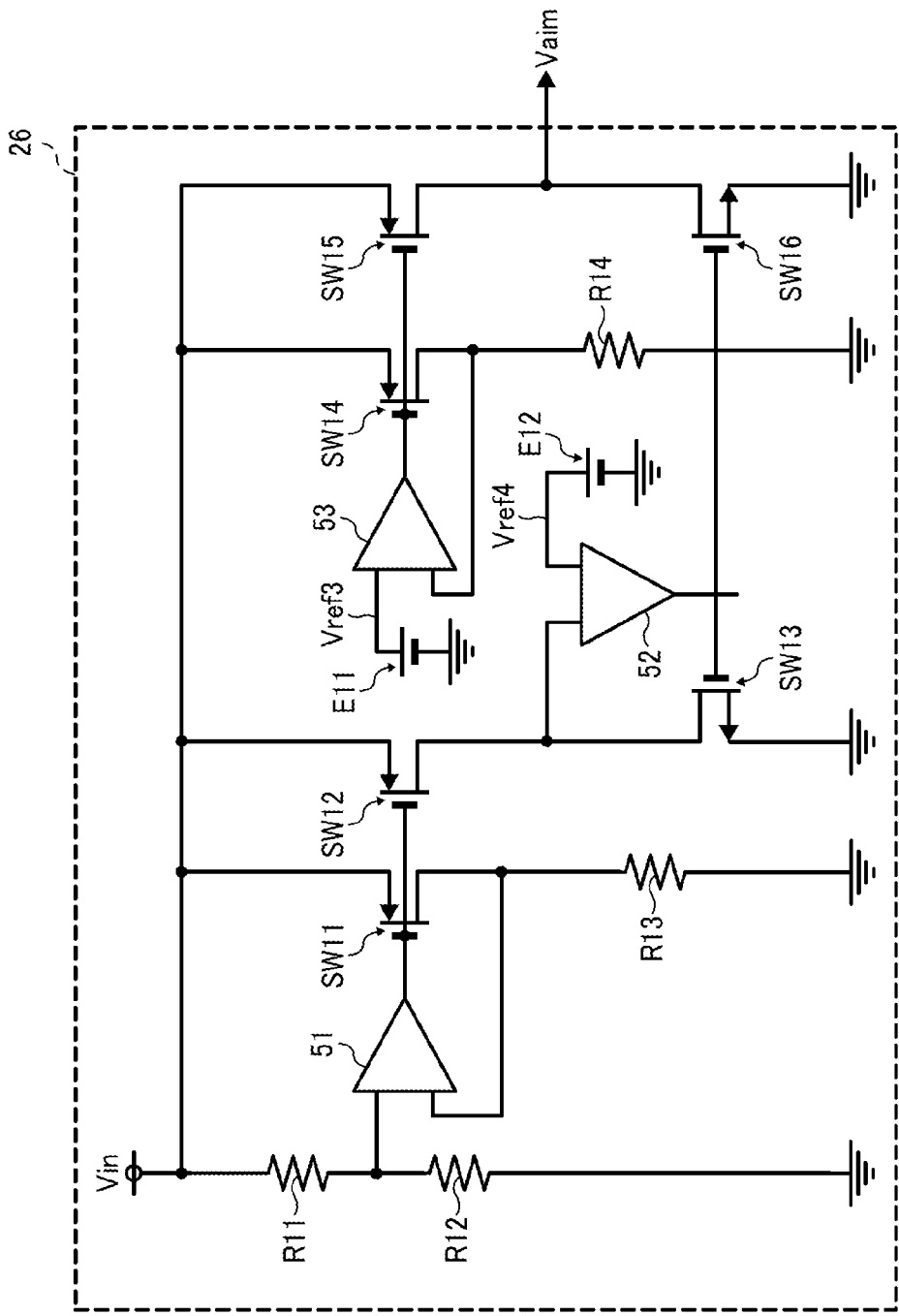
FIG. 5 is a circuit diagram illustrating the detailed structure of a target age generation circuit shown in FIG. 3.

FIG. 5 is a circuit diagram illustrating the detailed structure of the target error voltage generation circuit 26 shown in FIG. 3. In FIG. 5, when the target value of the output voltage Vout of the switching power supply device is represented by Vset, the error voltage Verror1 output from the error detection circuit 21 should be proportional to Vset/Vin in the normal state. Therefore, the target error voltage generation circuit 26 is set so as to generate the target error voltage Vaim that is proportional to Vset/Vin.

In FIG. 5, the target error voltage generation circuit 26 includes resistors R11 to R14, error detection circuits 51 to 53, N-channel or P-channel MOS field effect transistors (hereinafter, referred to as MOS transistors) SW11 to SW16, and reference voltage sources E11 and E12.

The reference voltage source E11 generates a reference voltage Vref3 that is equal to the target value Vset of the output voltage Vout of the switching power supply device. The reference voltage source E12 generates a predetermined reference voltage Vref4. The same input voltage Vin as the input voltage Vin of the switching power supply device shown in FIG. 1 is input to the target error voltage generation circuit 26. The input voltage Vin is divided by the resistors R11 and R12 and is then input to the error detection circuit 51. Then, a current that is proportional to the input voltage Vin flows to the resistor R13. Since the P-channel MOS transistors SW11 and SW12 are biased under the same conditions, the same current flows to the P-channel MOS transistors SW11 and SW12. Therefore, the current that is proportional to the input voltage Vin flows to the N-channel MOS transistor SW13. The N-channel MOS transistor SW13 operates in a linear region and can be treated as a variable resistor.

The drain voltage of the N-channel MOS transistor SW13 is controlled by the error detection circuit 52 so as to be equal to the reference voltage Vref4 of the reference voltage source E12. Therefore, when the N-channel MOS transistor SW13 is regarded as the variable resistor, a voltage that is equal to the reference voltage Vref4 of the reference voltage source E11 is applied and a current that is proportional to the input voltage Vin flows. Here, a resistance value between the drain and source of the N-channel MOS transistor SW13 is proportional to 1/Vin from the relational expression "voltage=resistor×current". The current which flows to the resistor R14 is controlled by the error detection circuit 53 so as to be proportional to the reference voltage Vref3 of the reference voltage source E11 (that is, the target value Vset of the output voltage Vout of the switching power supply device). Since the P-channel MOS transistors SW14 and SW15 are biased under the same conditions, the current which flows to the P-channel MOS transistors SW14 and SW15 is proportional to the size of the transistors. Therefore, the current which is proportional to the reference voltage Vref3 (that is, Vset) of the reference voltage source E11 also flows to the N-channel MOS transistor SW16. The gate voltage of the N-channel MOS transistor SW16 is equal to the gate voltage of the N-channel MOS transistor SW13 and the N-channel MOS transistor SW16 operates in the linear region. Therefore, the N-channel MOS transistor SW16 can be regarded as a variable resistor, similarly to the N-channel MOS transistor SW13, and has substantially the same resistance value as the N-channel MOS transistor SW 13. Therefore, when the N-channel MOS transistor SW16 is regarded as the variable resistor, the resistance value is proportional to 1/Vin and a current that is proportional to the reference voltage Vref1 (that is, Vset) of the reference voltage source E11 flows. Thus, the target error voltage Vaim is proportional to Vset/Vin from the relational expression "voltage=resistor× current". Therefore, the target error voltage Vaim is close to a desired value of the error voltage Verror1 output from the error detection circuit 21.

The converters 2 and 3 shown in FIG. 1 are characterized in that they adjust the difference between the reference voltage Vref1 of the reference voltage source E2 and the reference voltage Vref1 of the reference voltage source E1 in the converter 1 in both the operating state and the stop state. When the converter 2 is in the stop state, the sum of the reference voltage Vref1 and the integrated second error voltage Verror2 is used as the reference voltage Vref2 of the error detection circuit 21. Therefore, the reference voltage Vref2 is equal to the reference voltage Vref1 of the reference voltage source E1. The reason will be described below.

Even when the converters 2 and 3 are in the stop state, the master converter 1 is maintained in the operating state, such that the output voltage Vout of the switching power supply device is controlled to have the target value Vset. In addition, the error detection circuit 21 is operating. Therefore, in the normal state, the error voltage Verror1 output from the error detection circuit 21 should be proportional to Vset/Vin. However, in practice, the reference voltage Vref1 of the reference voltage source E2 in the converters 2 and 3 is different from the reference voltage Vref1 of the reference voltage source E1 in the converter 1. Therefore, the error voltage Verror1 is different from the ideal value when the converters 2 and 3 are in the operating state. The difference between the actual error voltage Verror1 and the ideal value is gradually increased by the integration circuit in the error detection circuit 21 over time. Therefore, the target error voltage generation circuit 26 generates the target error voltage Vaim, which is the target value of the error voltage Verror1, the error detection circuit 27 compares the target error voltage Vaim with the actual error voltage Verror1, and feedback is performed such that the difference becomes zero. As a result, the reference voltage Vref2 is expected to be equal to the reference voltage Vref1 of the reference voltage source E1. That the error voltage Verror1 is equal to the ideal value means that the converter 1 and the converters 2 and 3 have the same operation and the reference voltages Vref1 and Vref2 input to the error detection circuits 11 and 21 in the converters 1 to 3 are equal to each other.

The switching power supply device according to this embodiment is a voltage conversion device including the converters 1 to 3 which are connected in parallel to each other. The converter changes to the stop state when the power consumption of the load device 4 is small. In this case, the converter in the stop state adjusts the reference voltage Vref2 such that the error voltage Verror1 indicating the difference between the output voltage Vout and the reference voltage Vref2 is constantly equal to the target error voltage Vaim (the ideal value when the converter is in the operating state). Therefore, even in the converter in the stop state, it is possible to adjust the reference voltage so as to be equal to the reference voltage of the master converter 1. As a result, when the power consumption of the load device 4 increases, it is possible to restore the converter in the stop state in a short setting time.

According to the switching power supply device of this embodiment, an external controller does not need to control the operation of each of the converters 1 to 3 in order to adjust the output voltage and output current of each of the converters 1 to 3. In addition, when the power consumption of the load device is small, some of the converters are stopped to improve the power conversion efficiency of the entire switching power supply device. Since the time required to restore the converter in the stop state is short, the entire switching power supply device has a good response to a variation in the power consumption of the load device 4.

According to the switching power supply device of this embodiment, even when the converters 2 and 3 are in the stop state, all components in the converters 2 and 3 are not turned off, but some of the components are continuously operated. Therefore, restoration from the stop state to the operating state is performed at a high speed. With the above-described converts 2 and 3 having some components that continuously operate, the amount of current which is consumed in the stop state can be suppressed, without sacrificing the restoration time.

Second Embodiment

Figure 6:
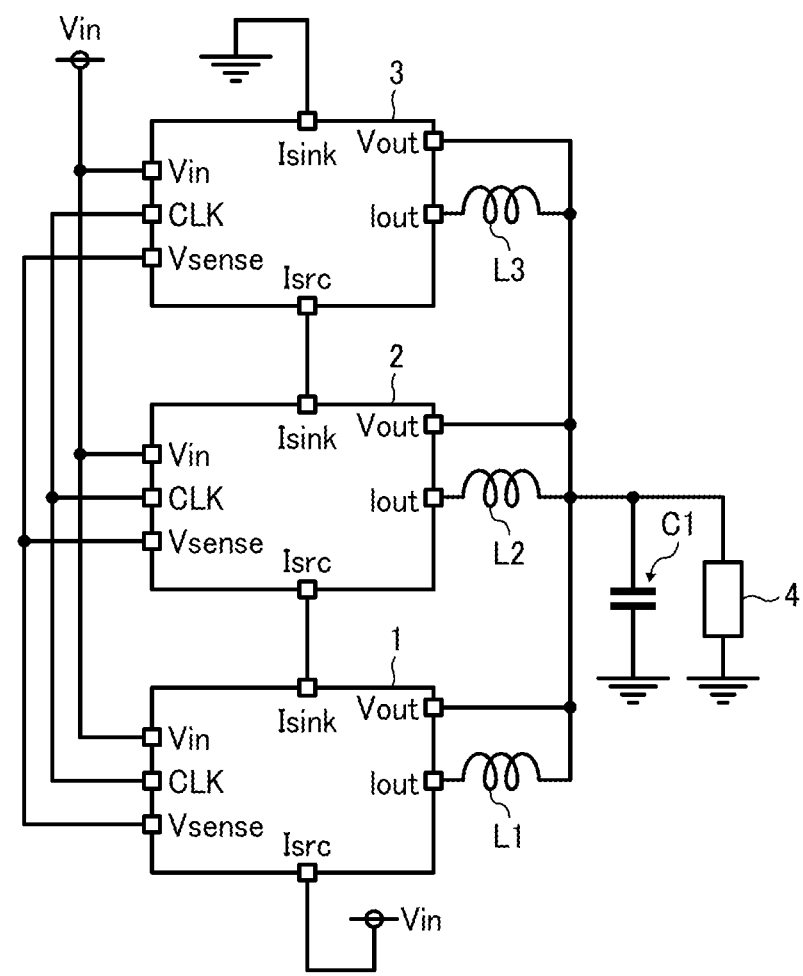
FIG. 6 is a block diagram illustrating the structure of a switching power supply device according to a second embodiment of the invention.
Figure 7:
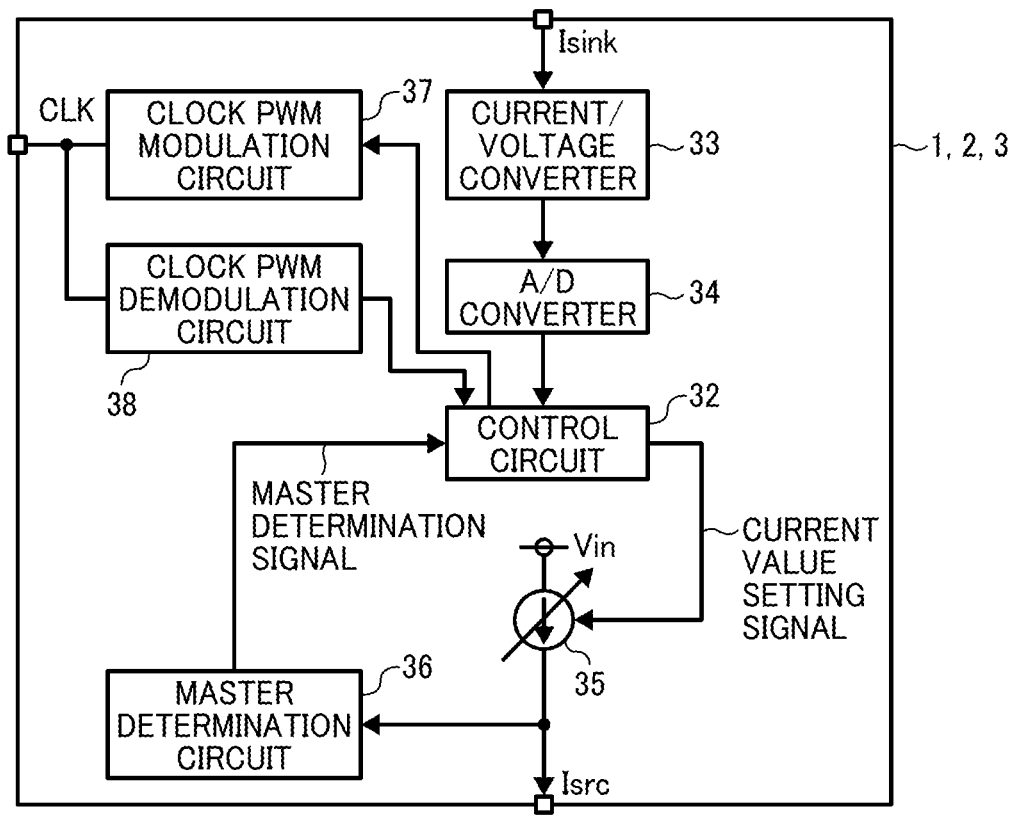
FIG. 7 is a block diagram illustrating a circuit for performing a process of detecting the number of operating converters and transmitting the number of operating converters in DC/DC converters of the switching power supply device shown in FIG. 6.

FIG. 6 is a block diagram illustrating the structure of a switching power supply device according to a second embodiment of the invention. FIG. 7 is a block diagram illustrating a circuit, which controls a process of detecting the number of operating converters and transmitting the number of operating converters in DC/DC converters 1, 2, and 3 of the switching power supply device shown in FIG. 6. The other circuits of the DC/DC converters 1, 2, and 3 have the same structures as those in the first embodiment shown in FIGS. 2 to 5. The second embodiment shown in FIG. 6 relates to a multi-phase switching power supply device, which does not require a dedicated controller, and differs from the first embodiment shown in FIG. 1 in the following points. (1) A switching synchronizing clock is supplied from the master converter 1 to the slave converters 2 and 3 through a switching synchronizing clock terminal CLK. (2) Each of the DC/DC converters 1, 2, 3, and 3A (shown in FIG. 9) further includes (a) a current inflow connection terminal Isink (hereinafter, referred to as a terminal Isink) for connecting adjacent converters and (b) a current outflow connection terminal Isrc (hereinafter, referred to as a terminal Isrc) for connecting adjacent converters.

FIG. 6 shows an example of the multi-phase switching power supply device which includes three converters connected in parallel and does not require an additional controller. The terminal Isink of the converter 2 is connected to the terminal Isrc of the converter 1 and the terminal Isink of the converter 3 is connected to the terminal Isrc of the converter 3 to connect a plurality of converters 1, 2, and 3 in a line. In the converters 1 and 3 which are provided at both ends, the terminal Isink of the converter 1 is grounded and the terminal Isrc of the converter 3 is connected to a voltage source with an input voltage Vin.

Similarly to the first embodiment, in the switching power supply device according to this embodiment, one of a plurality of converters 1, 2, and 3 which are connected in parallel to each other functions as the master converter 1 and the other converters function as the slave converters 2 and 3. The master converter 1 has a function of generating a reference clock and transmitting the reference clock to the slave converters 2 and 3 and a function of transmitting a voltage signal Vsense indicating an output current Iout. The slave converters 2 and 3 have a function of receiving the clock from the master converter 1 and performing, for example, a switching operation on the basis of the clock. The slave converters 2 and 3 have a function of comparing the voltage signal Vsense indicating the output current Iout from the master converter 1 with a voltage signal Vsense indicating its output current Iout and controlling the output current Iout so as to be equal to the output current Iout of the master converter 1.

In this embodiment, it is assumed that a converter having the terminal Isrc connected to the voltage source with the input voltage Vin operates as the master converter 1. However, the invention is not limited thereto. The converter having the terminal Isrc connected to the voltage source is not necessarily the master converter 1 and a converter having the terminal Isrc connected to the ground may be predetermined as the master converter 1. Alternatively, a converter having the terminal Isrc to which no component is connected may be predetermined as the master converter 1. In FIG. 6, the master converter 1 transmits the reference clock and the voltage signal Vsense indicating the output current Iout from the terminal CLK and the terminal Vsense to the slave converters 2 and 3.

Next, in the second embodiment, a process of outputting a predetermined current from the terminal Isrc to the terminal Isink and inputting the current to detect the number of operating converters and to transmit the number of operating converters in the plurality of converters 1, 2, and 3 which are cascaded in a line will be described with reference to FIGS. 7 and 8.

FIG. 7 is a block diagram illustrating a circuit for performing the process of detecting the number of operating converters and transmitting the number of operating converters. In FIG. 7, each of the converters 1, 2, and 3 includes a control circuit 32, a current/voltage converter 33, an A/D converter 34, a variable current source 35, a master determination circuit 36, a clock PWM modulation circuit 37, and a clock PWM demodulation circuit 38. The current/voltage converter 33 converts a current which flows from the terminal Isink into an analog voltage corresponding to the current. The A/D converter 34 converts the converted analog voltage into a digital value and outputs the digital value to the control circuit 32. The control circuit 32 performs the process of detecting the number of operating converters and transmitting the number of operating converters shown in FIG. 8, determines whether the host converter is the master converter on the basis of a master determination signal from the master determination circuit 36, detects the number of operating converters, and transmits the number of operating converters. In the process, the control circuit 32 sets the current value which is set in the process shown in FIG. 8 to the variable current source 35 using a current value setting signal and makes a current with the current value flow from the variable current source 35 to another converter through the terminal Isrc. When the voltage source with the input voltage Vin is connected to the terminal Isrc, the master determination circuit 36 determines that the host converter is the master converter. When the voltage source is not connected to the terminal Isrc, the master determination circuit 36 determines that the host converter is not the master converter. The clock PWM modulation circuit 37 performs PWM modulation on the clock according to information about the number of operating converters detected by the control circuit 32 on the basis of a control signal from the control circuit 32 and outputs the modulated clock. The clock PWM demodulation circuit 38 receives the clock, performs PWM demodulation on the clock to obtain the information about the number of operating converters, and outputs the information to the control circuit 32. The clock PWM modulation circuit 37 operates when it is the master converter and the clock PWM demodulation circuit 38 operates when it is the slave converter.

Figure 8:
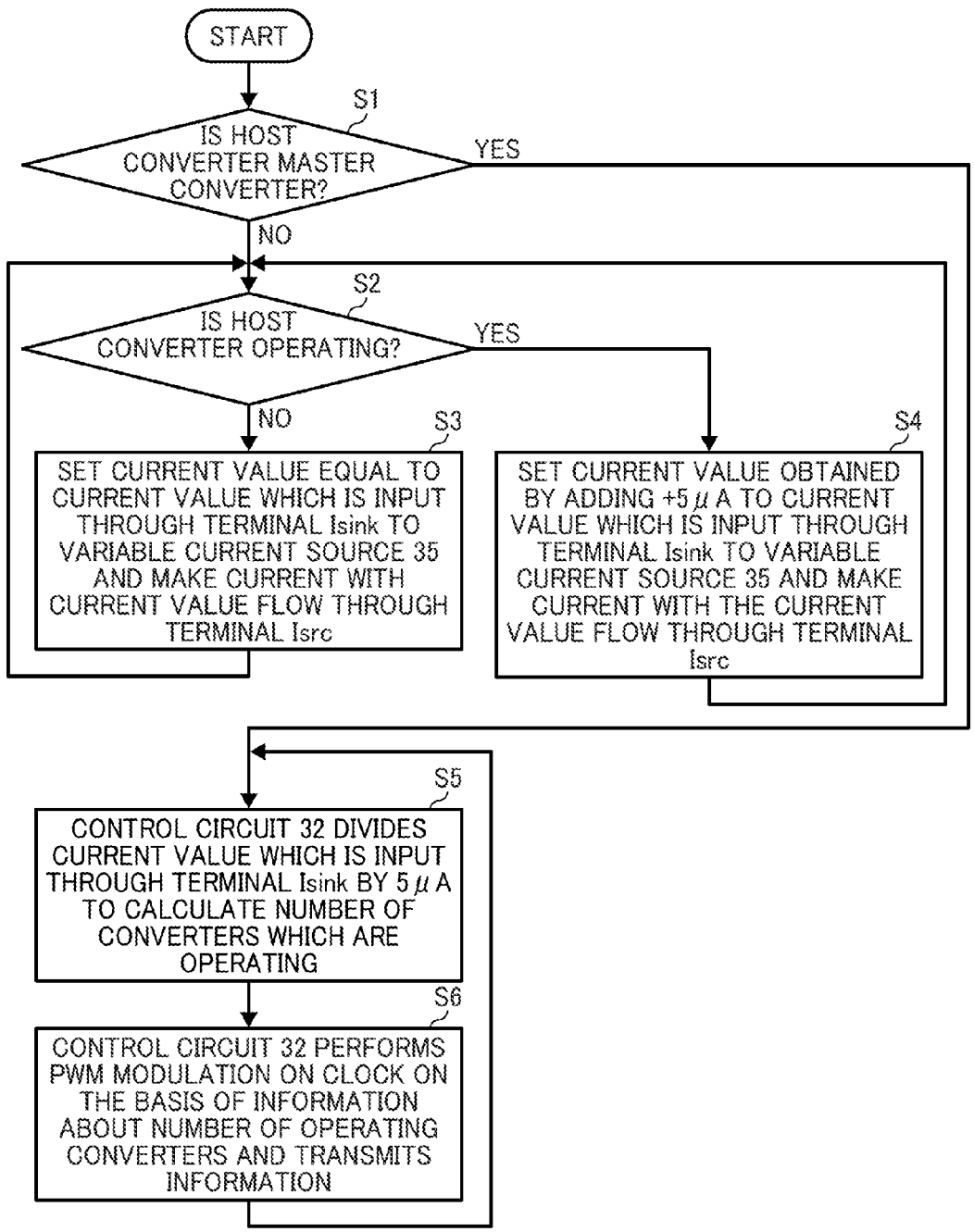
FIG. 8 is a flowchart illustrating the process of detecting the number of operating converters and transmitting the number of operating converters which is performed by a control circuit in each of the DC/DC converters shown in FIG. 7.

FIG. 8 is a flowchart illustrating the process of detecting the number of operating converters and transmitting the number of operating converters which is performed by the control circuit 32 in the DC/DC converters 1, 2, 3, 2A, and 3A shown in FIG. 7.

In step S1 of FIG. 8, the control circuit 32 determines whether the host converter is the master converter on the basis of the master determination signal from the master determination circuit 36. When the determination result is YES, the control circuit proceeds to step S5. On the other hand, when the determination result is NO, the control circuit proceeds to step S2. In step S2, the control circuit 32 determines whether the host converter is operating. When the determination result is YES, the control circuit proceeds to step S4.

On the other hand, when the determination result is NO, the control circuit proceeds to step S3. In step S4, the control circuit 32 sets a current value obtained by adding +5 µA to the current value which is input from the terminal Isink to the variable current source 35. Then, the control circuit 32 makes a current with the current value flow through the terminal Isrc. Then, the control circuit returns to step S2. In step S3, the control circuit 32 sets the same current value as that flowing from the terminal Isink to the variable current source 35 and makes the current with the current value flow through the terminal Isrc. Then, the control circuit to step 52. In step S5, the control circuit 32 calculates the number of converters which are operating from a value obtained by dividing the current value that flows through the terminal Isink by 5 µA. Then, in step S6, the control circuit 32 performs PWM modulation on the clock on the basis of information about the number of operating converters and transmits the information. Then, the control circuit returns to step S5.

When the above-mentioned process shown in FIG. 8 is performed, the slave converters 2 and 3 can recognize the number of converters which are operating among the converters 1, 2, and 3 connected in parallel to each other and recognize its order among the converters which are operating. That is, it is difficult to know the number of converters connected to the terminal Isrc of a given converter and the number of converters which are operating among the connected converters from only the current which flows from the terminal Isink. The master converter 1 can recognize the number of converters which are operating among the converters 1, 2, and 3 connected in parallel to each other from the amount of current input from the terminal Isink. The master converter 1 transmits information about the number of parallel operating converters, which has been known from the current input from the terminal Isink, to the slave converters 2 and 3 by performing PWM modulation on the switching synchronizing clock using the clock PWM modulation circuit 37. Therefore, the slave converters 2 and 3 can obtain the information about the number of parallel operating converters by performing PWM demodulation on the switching synchronizing clock using the clock PWM demodulation circuit 38.

In the multi-phase switching power supply device having the above-mentioned structure, the reason why a separate converter does not need to be added in order to implement the functions of the multi-phase switching power supply device will be described below.

Each of the converters 1, 2, and 3 needs to recognize the number of operating converters (the number of phases) and to adjust the gain of a control loop for stable operation. This embodiment has the structure in which wiring is performed such that a plurality of converters 1, 2, and 3 are cascaded in a line and a current is exchanged among the converters. and the structure in which the switching synchronizing clock shared by the converters 1, 2, and 3 is modulated and transmitted. Therefore, each of the converters 1, 2, and 3 can recognize the number of converters which are operating in parallel. Since each of the converters 1, 2, and 3 can adjust the gain of the control loop, it is not necessary to add a separate controller.

In addition, each of the converters 1, 2, and 3 needs to recognize the operation order and it is necessary to synchronously perform switching according to the order while shifting the phases at equal intervals. In the related art, this has been performed by a separate controller. In the structure shown in FIG. 6 in which wiring is performed such that a plurality of converters 1, 2, and 3 are cascaded in a line and a current is exchanged among the converters, since each of the converters 1, 2, and 3 can recognize the operation order, each of the converters 1, 2, and 3 can sequentially shift the phase according to the operation order. In addition, it is not necessary to add a separate controller. In this embodiment, the plurality of converters 1, 2, and 3 are cascaded in a line and recognize the number of operating converters using the current exchanged therebetween. Therefore, it is possible to arbitrarily change the number of parallel connections.

Further, the reason why it is possible to dynamically change be number of converters which are operating in parallel will be described below.

The plurality of converters 1, 2, and 3 are connected in a line and each of the plurality of converters 1, 2, and 3 can recognize the number of operating converters and its order among the converters which are operating, using the current exchanged therebetween. Therefore, it is possible to change the number of operating converters, Each of the plurality of converters 1, 2, and 3 needs to recognize the number of parallel operations and its order in order to change the number of converters which are operating in parallel. There are the following three reasons therefor.

(1) First, it is necessary to know the number of parallel operations in order to control a feedback gain in the output voltage control of the entire system including a plurality of converters such that the feedback gain is constant regardless of the number of parallel operations and to perform a stable operation. The converters independently perform output voltage feedback control. Therefore, the feedback gain of the entire system including the converters which are operating in parallel is the sum of the feedback gains of each converter. Therefore, each converter needs to adjust the feedback gain whenever the number of parallel operations is changed. (2) Second, each converter needs to recognize the number of parallel operations and its order and to autonomously determine the operating state or the stop state in order to improve power conversion efficiency and to implement the structure which changes the number of parallel operations depending on a load, without using a separate control IC. (3) Third, the switching times of the converters which operate in parallel are shifted at equal intervals. Therefore, the added output current is averaged and the effect of reducing ripple is expected. However, in order to achieve the effect, each converter needs to recognize the number of parallel operations and its order and to have a function of shifting the switching time.

In addition, the reason why it is possible o reduce the number of terminals required when the converter is mounted as an IC is as follows. It is possible to implement a multi-phase function only by adding a total of four terminals, that is, two terminals Isink and Isrc for cascading the plurality of converters 1, 2, and 3 in a line, the synchronizing clock terminal CLK, and the control voltage signal terminal Vsense for adjusting the balance between the converters. However, the output current terminal Iout and the output voltage terminal Vout are excluded.

In the second embodiment, in step S4 of FIG. 8, the control circuit adds 5 μA to the current value which is detected while the host converter is operating. However, the invention is not limited thereto. The control circuit may add a predetermined addition current value.

In the second embodiment, the terminal Isink of the slave converter 3 is grounded and the initial current value is 0. However, the invention is not limited thereto. The initial current value may be a predetermined value that is greater than 0 and the predetermined value may be subtracted from the current value which is set to the variable current source 35 by the control circuit 32 in each of the converters 1, 2, and 3.

Third Embodiment

Figure 9:
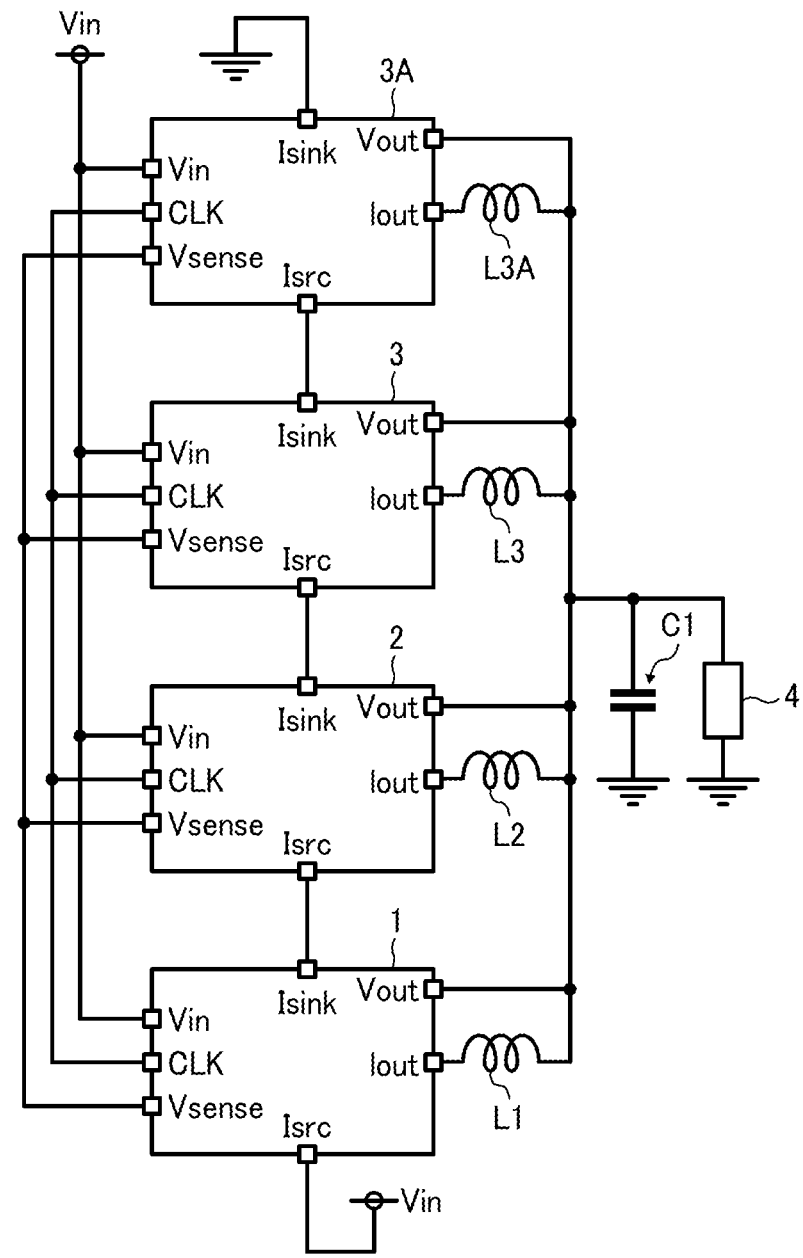
FIG. 9 is a block diagram illustrating the structure of a switching power supply device according to a third embodiment of the invention.

FIG. 9 is a block diagram illustrating the structure of a switching power supply device according to a third embodiment of the invention. The third embodiment shown in FIG. 9 differs from the second embodiment shown in FIG. 6 in that four converters 1, 2, 3, and 3A (3A denotes a slave converter) are cascaded using terminals Isink and terminals Isrc. The third embodiment addresses the following when compared with the second embodiment.

In FIG. 6, it is assumed that an A/D converter 34 of the converter 1 receives a current of 5 μA. The converter 1 can only recognize that at least one converter is operating among the converters other than the converter 1 except for the master converter. In FIG. 6, three converters 1, 2, and 3 are connected in parallel to each other. However, the converter 1 does not recognize whether the converter 3 is present. Therefore, the following problem occurs. The converter 1 is not capable of distinguishing the following states and case only from information indicating the A/D converter 34 receives a current of 5 μA: (A) a state in which the converter 3 is operating and the converter 2 is stopped; (B) a state in which the converter 3 is stopped and the converter 2 is operating; (C) a state in which the converter 3 is not actually present and the converter 2 is operating; and a case in which another converter is provided before the converter 1.

The problem due to the non-distinguishment and the reason why the problem does not matter will be described below with reference to FIG. 9. The switching power supply device shown in FIG. 9 includes a master converter 1 and slave converters 2, 3, and 3A.

It is assumed from the above-mentioned situation that, in FIG. 9, the master converter 1 is in a stop state, one of the slave converters 2, 3, and 3A in the stop state is changed to an operating state since a load is increasing gradually, and it is necessary to increase the number of converters which are operating in parallel by one. It is possible to indirectly detect the level of the load by detecting a voltage signal Vsense from the master converter 1 at the terminal Vsense shown in FIG. 9. In the case of (A), the converter 3 may change to the operating state and the converter 3A may be maintained in the stop state. In the case of (B), the converter 2 may change to the operating state and the converter 3A may be maintained in the stop state. In the case of (C), the converter 2 needs to change to the operating state. It is difficult to determine whether the state is (A), (B), or (C). Therefore, (C) is assumed and the converter 2 needs to change from the operating state to the stop state. However, in the case of (A), the converter 3 is likely to change to the operating state at the same time and the converter 3 and the converter 3A change from the stop state to the operating state at the same time. Similarly, in the case of (B), the converter 3A is also likely to change to the operating state at the same time and the converter 3A and the converter 3 change from the stop state to the operating state at the same time. As such, when the number of parallel operations is increased by two at the same time, the state (C) is not established since the A/D converter 34 of the converter 3A receives a current of 10 μA. Therefore, the converter 2 determines to return from the operating state to the stop state again.

As described above, in the case of (A) or (B), the converter 2 changes to the operating state once. However, finally, the converter 2 returns to the stop state. Therefore, it is possible to increase the total number of parallel operations by one. However, there is a problem that it takes a lot of time to fall a stable state due to the switching between the stop state and the operating state. The third embodiment is configured in order to solve at least this problem.

Figure 10:
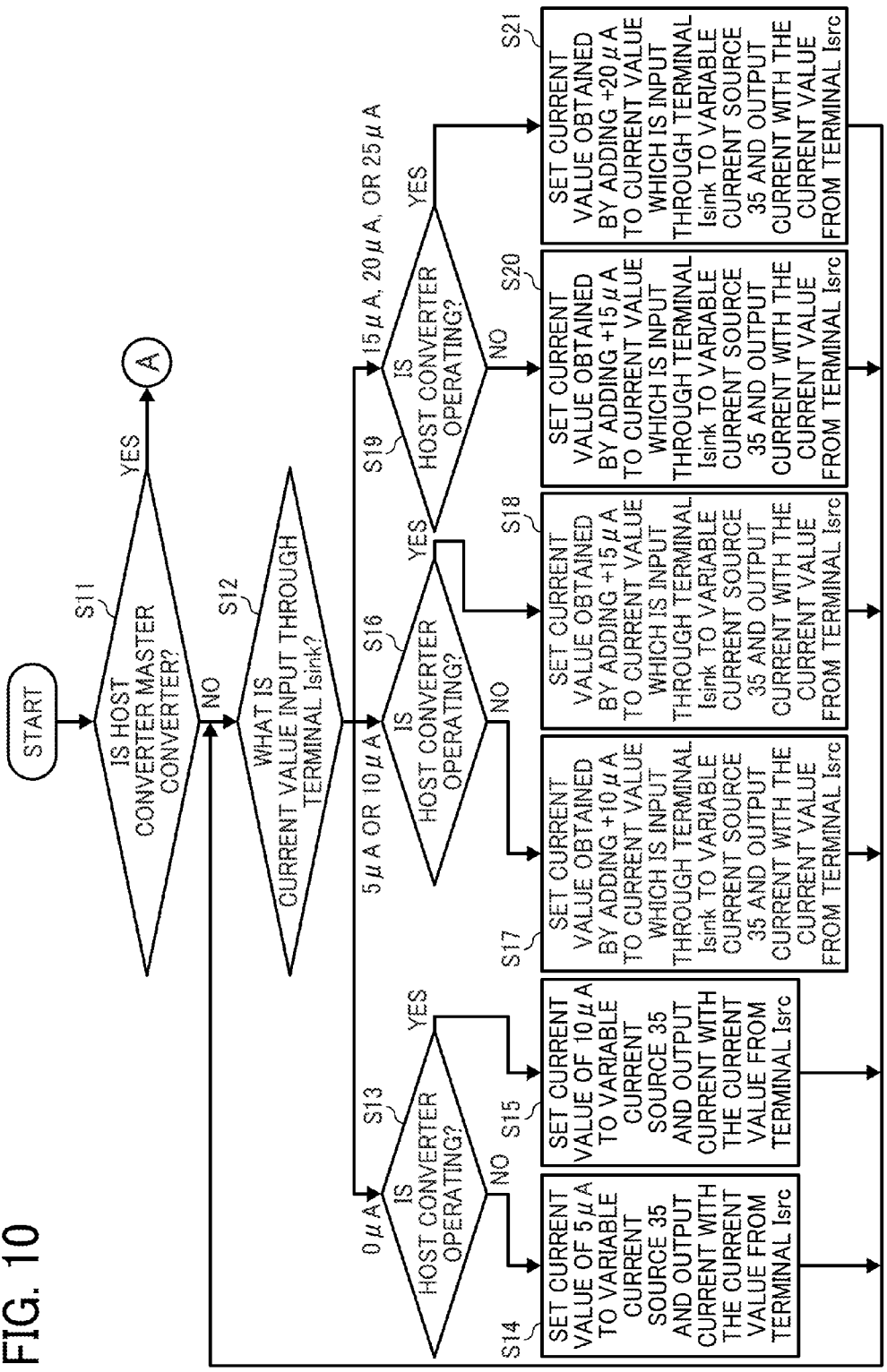
FIG. 10 is a flowchart illustrating a first portion of a process of detecting the number of operating converters and transmitting the number of operating converters which is performed by the control circuit in each of DC/DC converters shown in FIG. 9.
Figure 11:
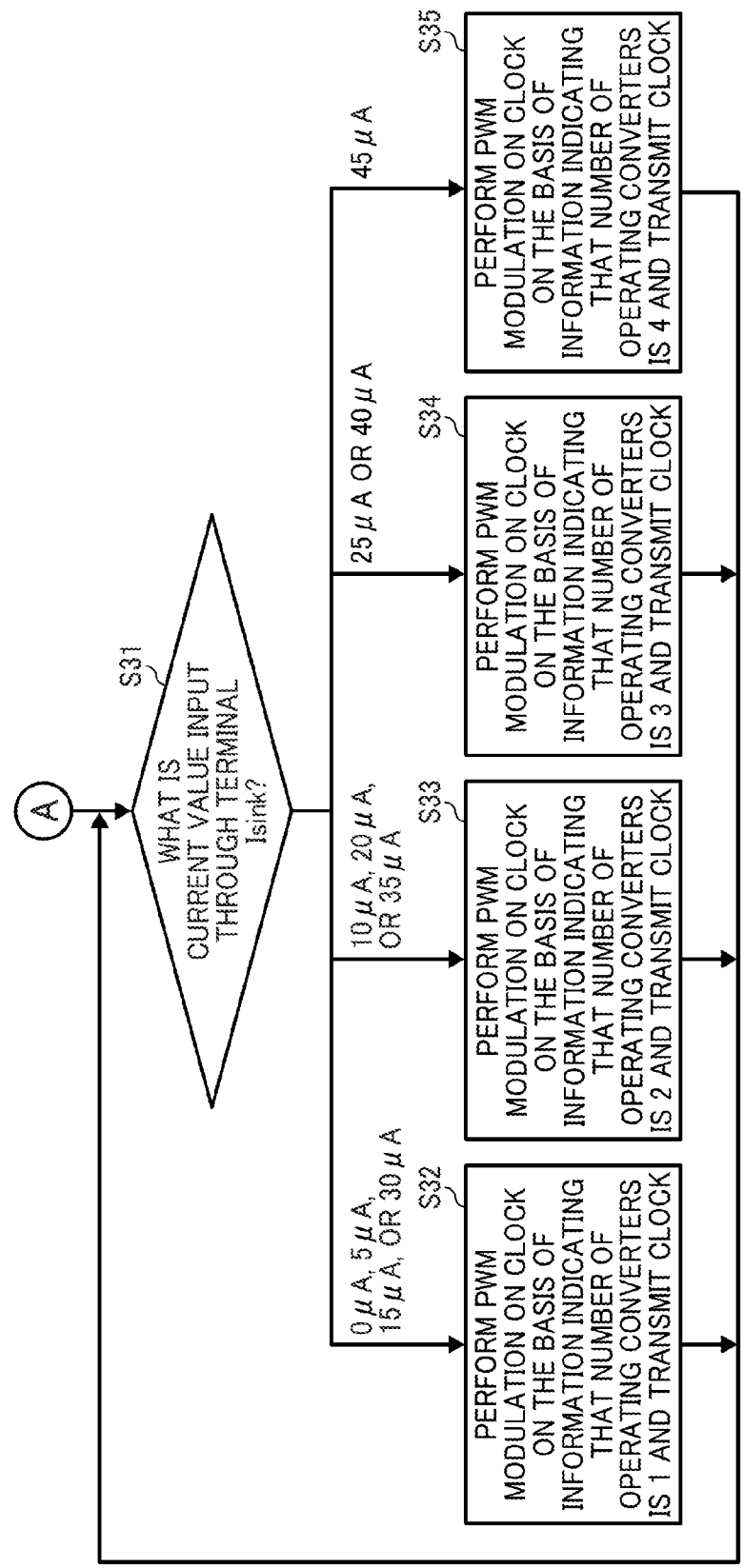
FIG. 11 is a flowchart illustrating a second portion of the process of detecting the number of operating converters and transmitting the number of operating converters shown in FIG. 10.

FIGS. 10 and 11 are flowcharts illustrating a process of detecting the number of operating converters and transmitting the number of operating converters which is performed by a control circuit 32 in each of the DC/DC converters 1, 2, 3, and 3A shown in FIG. 9.

In step S11 of FIG. 10, the control circuit determines whether the host converter is the master converter on the basis of a master determination signal from a master determination circuit 36. When the determination result is YES, the control circuit proceeds to step S31 in FIG. 11. When the determination result is NO, the control circuit proceeds to step S12. In step S12, the control circuit detects a current value which is input through the terminal Isink. When the current value is 0 µA, the control circuit proceeds to step S13. When the current value is 5 µA or 10 µA, the control circuit proceeds to step S16. When the current value is 15 µA, 20 µA, or 25 µA, the control circuit proceeds to step S19. In step S13, the control circuit determines whether the host converter is operating. When the determination result is YES, the control circuit proceeds to step S15. When the determination result is NO, the control circuit proceeds to step S14. In step S14, the control circuit sets a current value of 5 µA (=0+5: a second current addition value is 5) to a variable current source 35, outputs a current with the current value from the terminal Isrc, and returns to step S12. In step S15, the control circuit sets a current value of 10 µA (=0+10: a first current addition value is 10) to the variable current source 35, outputs a current with the current value from the terminal Isrc, and returns to step S12.

In step S16, the control circuit determines whether the host converter is operating. When the determination result is YES, the control circuit proceeds to step S18. When the determination result is NO, the control circuit proceeds to step S17. In step S17, the control circuit adds a second current addition value of +10 µA to the current value which is input through the terminal Isink, sets the current value, which is the addition result, to the variable current source 35, outputs a current with the current value through the terminal Isrc, and returns to step S12. In step S18, the control circuit adds a first current addition value of +15 µA to the current value which is input through the terminal Isink, sets the current value, which is the addition result, to the variable current source 35, outputs a current with the current value through the terminal Isrc, and returns to step S12.

In step S19, the control circuit determines whether the host converter is operating. When the determination result is YES, the control circuit proceeds to step S21. When the determination result is NO, the control circuit proceeds to step S20. In step S20, the control circuit adds a second current addition value of +15 µA to the current value which is input through the terminal Isink, sets the current value, which is the addition result, to the variable current source 35, outputs a current with the current value through the terminal Isrc, and returns to step S12. In step S21, the control circuit adds a first current addition value of +20 µA to the current value which is input through the terminal Isink, sets the current value, which is the addition result, to the variable current source 35, outputs a current with the current value through the terminal Isrc, and returns to step S12.

In step S31 of FIG. 11, the control circuit detects the current value which is input to the terminal Isink. When the current value is 0 µA, 5 µA, 15 µA, or 30 µA, the control circuit proceeds to step S32. When the current value is 10 µA, 20 µA, or 35 µA, the control circuit proceeds to step S33. When the current value is 25 µA or 40 µA, the control circuit proceeds to step S34. When the current value is 45 µA, the control circuit proceeds to step S35. In step S32, the control circuit performs PWM modulation on a clock on the basis of information indicating that the number of operating converters is 1, transmits the clock, and returns to step S31. In step S33, the control circuit performs PWM modulation on the clock on the basis of information indicating that the number of operating converters is 2, transmits the clock, and returns to step S31. In step S34, the control circuit performs PWM modulation on the clock on the basis of information indicating that the number of operating converters is 3, transmits the clock, and returns to step S31. In step S35, the control circuit performs PWM modulation on the clock on the basis of information indicating that the number of operating converters is 4, transmits the clock, and returns to step S31.

The first and second current addition values of the DC/DC converters 1, 2, 3, and 3A are set in steps S14, S15, S17, S28, S20, and S21 as follows. From the slave converter which is far from the master converter to the slave converter which is near the master converter, the first current addition value of the slave converter in a predetermined stage is set to be equal to the second current addition value of the slave converter in the next stage. Branch conditions in steps S13, S16, and S19 are set by the current value which is likely to be generated by the slave converter in the previous stage. The master converter sets the current which is detected at the terminal Isink in each converter so as to vary depending on at least the number of operating converters, which will be described below with reference to FIG. 12.

In step S11 of FIG. 10, the control circuit determines the master converter. The reason is as follows. Since the converter having the terminal Isrc connected to the voltage source is the master converter, the converter 1 functions as the master converter and the master converter does not automatically change to the stop state. The other converters 2, 3, and 3A function as slave converters and are in the stop state or the operating state. Since the terminal Isink of the converter 3A is grounded, no current flows to the terminal Isink of the converter 3A. According to the flowchart shown in FIG. 10, when the converter 3A is in the operating state, a current of 10 µA flows from the terminal Isrc of the converter 3A. When the converter 3A is in the stop state, a current of 5 µA flows from the terminal Isrc of the converter 3A. As shown in FIG. 9, the terminal Isink of the converter 3 is connected to the terminal Isrc of the converter 3A. A current of 5 µA or 10 µA is input to the terminal Isink of the converter 3. Here, it is assumed as a rule that, when the converter 3A is in the stop state, the converter 3 is not in the operating state. According to the flowchart shown in FIG. 10, when the converter 3 is in the operating state, the converter 3A is also in the operating state and a current of 25 µA is output from the terminal Isrc of the converter 3. When the converter 3 is in the stop state and the converter 3A is in the stop state, a current of 15 µA is output from the terminal Isrc of the converter 3. When the converter 3 is in the stop state and the converter 3A is in the operating state, a current of 20 µA is output from the terminal Isrc of the converter 3. The process is performed in this way and the relationship between the detected current and the operating state is shown in a table of FIG. 12.

FIG. 12 is a table illustrating the detection current at the terminal Isink in each of the DC/DC converters 1, 2, 3, and 3A which corresponds to the operating state or the stop state of each of the DC/DC converters 1, 2, 3, and 3A shown in FIG. 9. As can be seen from FIG. 12, the master converter 1 constantly operates and the slave converters 2, 3, and 3A are sequentially controlled to the operating state from the slave converter which is far from the master converter 1. According to the processes shown in FIGS. 11 and 12, the ambiguity which occurs in the process shown in FIG. 8 is removed. Therefore, when the number of converters which operate in parallel is changed, the problem that the converters change to two operating states at the same time does not occur and a stable operation can be expected. However, the invention can be applied to a switching power supply device including four or more converters.

As described above, the second and third embodiments have the structure in which wiring is performed such that a plurality of converters are cascaded in a line and a current is exchanged between the converters and the structure in which the synchronizing clock shared by the plurality of converters is modulated and transmitted. Therefore, it is possible to recognize the number of converters which are operating in parallel and the order of the converters. In addition, when the converter is mounted as an IC, a multi-phase power supply function can be implemented only by a total of four terminals, that is, two terminals Isink and Isrc for connecting a plurality of converters in a line, the synchronizing clock terminal CLK, and the control voltage signal terminal Vsense for adjusting the balance between the converters.

In the first embodiment, each of the converters 1 to 3 includes two switching elements SW1 and SW2 and operates as a synchronous-rectification-type converter. However, the converter may be other types including at least one switching element. In addition, in each of the above-described embodiments, the switching power supply device may include one master converter and three or more slave converters.

The switching power supply devices according to any of the above-described embodiments can be provided as power supply devices in electronic apparatuses, such as mobile phones, smart phones, tablets, and personal computers.

According to a first aspect, there is provided a DC/DC converter for a switching power supply device including a plurality of DC/DC converters which include a master DC/DC converter and a plurality of slave DC/DC converters and have output terminals connected in parallel to each other. The DC/DC converter includes: first and second terminals that are used to cascade the plurality of DC/DC converters in a line; a determination unit that determines that a host DC/DC converter is the master DC/DC converter when a predetermined voltage is detected at the second terminal and determines that the host DC/DC converter is the slave DC/DC converter when the predetermined voltage is not detected; and a control unit that controls a current output from the second terminal on the basis of whether the host DC/DC converter is the master DC/DC converter or the slave DC/DC converter. The first terminal of the slave DC/DC converter which is far from the master DC/DC converter is grounded. (1) When the host DC/DC converter is determined to be the slave DC/DC converter, the control unit detects a current value of a current which flows from the first terminal; adds a predetermined addition current value to the detected current value and outputs a current with the sum of the current values through the second terminal if the host DC/DC converter is operating; and outputs the current with the detected current value through the second terminal if the host DC/DC converter does not operate. (2) When the host DC/DC converter is determined to be the master DC/DC converter, the control unit divides the detected current value by the addition current value, detects the number of converters which are operating on the basis of the divided value, and transmits information about the detected number of operating converters to the slave DC/DC converter. For example, the determination unit and the control unit may be implemented by a control circuit.

According to a second aspect, there is provided a DC/DC converter for a switching power supply device including a plurality of DC/DC converters which include a master DC/DC converter and a plurality of slave DC/DC converters and have output terminals connected in parallel to each other. The DC/DC converter includes: first and second terminals that are used to cascade the plurality of DC/DC converters in a line; a determination unit that determines that a host DC/DC converter is the master DC/DC converter when a predetermined voltage is detected at the second terminal and determines that the host DC/DC converter is the slave DC/DC converter when the predetermined voltage is not detected; and a control unit that controls a current output from the second terminal on the basis of whether the host DC/DC converter is the master DC/DC converter or the slave DC/DC converter. A predetermined initial current value is supplied to the first terminal of the slave DC/DC converter which is far from the master DC/DC converter (1) When the host DC/DC converter is determined to be the slave DC/DC converter, the control unit detects a current value of a current which flows from the first terminal; subtracts the initial current value from the detected current value, adds a predetermined addition current value to the subtraction result, and outputs a current with the sum of the current values through the second terminal if the host DC/DC converter is operating; and outputs the current with the detected current value through the second terminal if the host DC/DC converter does not operate. (2) When the host DC/DC converter is determined to be the master DC/DC converter, the control unit divides the detected current value by the addition current value, detects the number of converters which are operating on the basis of the divided value, and transmits information about the detected number of operating converters to the slave DC/DC converter. For example, the determination unit and the control unit may be implemented by a control circuit.

According to a third aspect, there is provided a DC/DC converter for a switching power supply device including a plurality of DC/DC converters which include a master DC/DC converter and a plurality of slave DC/DC converters and have output terminals connected in parallel to each other. The DC/DC converter includes: first and second terminals that are used to cascade the plurality of DC/DC converters in a line; a determination unit that determines that a host DC/DC converter is the master DC/DC converter when a predetermined voltage is detected at the second terminal and determines that the host DC/DC converter is the slave DC/DC converter when the predetermined voltage is not detected; and a control unit that controls a current output from the second terminal on the basis of whether the host DC/DC converter is the master DC/DC converter or the slave DC/DC converter. The first terminal of the slave DC/DC converter which is far from the master DC/DC converter is grounded. The DC/DC converters are configured so as to sequentially operate from the slave DC/DC converter which is far from the master DC/DC converter. (1) When the host DC/DC converter is determined to be the slave DC/DC converter, the control unit detects a current value of a current which flows from the first terminal; adds a first predetermined addition current value to the detected current value and outputs a current with the sum of the current values through the second terminal if the host DC/DC converter does not operate; and adds a second predetermined addition current value greater than the first addition current value to the detected current value and outputs a current with the sum of the current values through the second terminal if the host DC/DC converter is operating. (2) When the host DC/DC converter is determined to be the master DC/DC converter, the control unit detects the number of converters which are operating on the basis of the detected current value and transmits information about the detected number of operating converters to the slave DC/DC converter; the first and second current addition values of each of the DC/DC converters are set such that the first current addition value of the slave DC/DC converter in a predetermined stage is equal to the second current addition value of the slave DC/DC converter in the next stage, from the slave DC/DC converter which is far from the master DC/DC converter to the slave DC/DC converter which is near the master DC/DC converter; and a current which is detected from a terminal kink of the master DC/DC converter is set so as to vary depending on the number of operating converters. For example, the determination unit and the control unit may be implemented by a control circuit.

According to a fourth aspect, in the DC/DC converter according to any one of the first to third aspects, the control unit performs PWM modulation on a switching synchronizing clock on the basis of the information about the detected number of operating converters and transmits the switching synchronizing clock to the slave DC/DC converter.

According to a fifth aspect, there is provided a switching power supply device including a plurality of the DC/DC converters according to any one of the first to fourth aspects that are connected in parallel to each other.

According to a sixth aspect, there is provided an electronic apparatus including the switching power supply device according to the fifth aspect.

According to some embodiments of the invention, a separate controller is not required in order to implement the functions of a multi-phase power supply device using each DC/DC converter. This can arbitrarily change the number of parallel connections, dynamically change the number of parallel operations (the number of operating phases), or reduce the number of terminals required to add a multi-phase power supply function when the DC/DC converter is mounted as, for example, an IC.

The switching power supply devices according to the above-mentioned aspects of the invention can be applied to, for example, switching power supply devices including converters having inductors provided therein.

Numerous additional modifications and variations are possible in light of the above teachings. It is therefore to be understood that within the scope of the appended claims, the disclosure of the present invention may be practiced otherwise than as specifically described herein. For example, elements and/or features of different illustrative embodiments may be combined with each other and/or substituted for each other within the scope of this disclosure and appended claims.

What is claimed is:

1. A DC/DC converter for a switching power supply device including a plurality of DC/DC converters which include a master DC/DC converter and a plurality of slave DC/DC converters and have output terminals connected in parallel to each other, comprising:
   first and second terminals that are used to cascade the plurality of DC/DC converters in a line;
   a control circuit that determines that a host DC/DC converter is the master DC/DC converter when a predetermined voltage is detected at the second terminal and determines that the host DC/DC converter is the slave DC/DC converter when the predetermined voltage is not detected, and
   controls a current output from the second terminal based on whether the host DC/DC converter is the master DC/DC converter or the slave DC/DC converter,
   wherein the first terminal of the slave DC/DC converter which is far from the master DC/DC converter is grounded,
   (1) when the host DC/DC converter is determined to be the slave DC/DC converter, the control circuit detects a current value of a current which flows from the first terminal; and
   adds a predetermined addition current value to the detected current value and outputs a current with the sum of the current values through the second terminal if the host DC/DC converter is operating, or outputs the current with the detected current value through the second terminal if the host DC/DC converter does not operate, and
   (2) when the host DC/DC converter is determined to be the master DC/DC converter, the control circuit divides the detected current value by the addition current value, detects the number of converters which are operating based on the divided value, and transmits information indicating the detected number of operating converters to the slave DC/DC converter.

2. A DC/DC converter for a switching power supply device including a plurality of DC/DC converters which include a master DC/DC converter and a plurality of slave DC/DC converters and have output terminals connected in parallel to each other, comprising:
   first and second terminals that are used to cascade the plurality of DC/DC converters in a line;
   a control circuit that determines that a host DC/DC converter is the master DC/DC converter when a predetermined voltage is detected at the second terminal and determines that the host DC/DC converter is the slave DC/DC converter when the predetermined voltage is not detected, and
   controls a current output from the second terminal based on whether the host DC/DC converter is the master DC/DC converter or the slave DC/DC converter,
   wherein a predetermined initial current value is supplied to the first terminal of the slave DC/DC converter which is far from the master DC/DC,
   (1) when the host DC/DC converter is determined to be the slave DC/DC converter, the control circuit detects a current value of a current which flows from the first terminal; and
   subtracts the initial current value from the detected current value, adds a predetermined addition current value to the subtraction result, and outputs a current with the sum of the current values through the second terminal if the host DC/DC converter is operating, or outputs the current with the detected current value through the second terminal if the host DC/DC converter does not operate, and
   (2) when the host DC/DC converter is determined to be the master DC/DC converter, the control circuit divides the detected current value by the addition current value, detects the number of converters which are operating based on the divided value, and transmits information indicating the detected number of operating converters to the slave DC/DC converter.

3. A DC/DC converter for a switching power supply device including a plurality of DC/DC converters which include a master DC/DC converter and a plurality of slave DC/DC converters and have output terminals connected in parallel to each other, comprising:
   first and second terminals that are used to cascade the plurality of DC/DC converters in a line;
   a control circuit that determines that a host DC/DC converter is the master DC/DC converter when a predetermined voltage is detected at the second terminal and determines that the host DC/DC converter is the slave DC/DC converter when the predetermined voltage is not detected, and
   that controls a current output from the second terminal based on whether the host DC/DC converter is the master DC/DC converter or the slave DC/DC converter;
   wherein the first terminal of the slave DC/DC converter which is far from the master DC/DC converter is grounded, the DC/DC converters are configured so as to sequentially operate from the slave DC/DC converter which is far from the master DC/DC converter, (1) when the host DC/DC converter is determined to be the slave DC/DC converter, the control circuit detects a current value of a current which flows from the first terminal; and adds a first predetermined addition current value to the detected current value and outputs a current with the sum of the current values through the second terminal if the host DC/DC converter does not operate, or adds a second predetermined addition current value greater than the first addition current value to the detected current value and outputs a current with the sum of the current values through the second terminal if the host DC/DC converter is operating, and (2) when the host DC/DC converter is determined to be the master DC/DC converter, the control circuit detects the number of converters which are operating based on the detected current value and transmits information indicating the detected number of operating converters to the slave DC/DC converter;

the first and second current addition values of each of the DC/DC converters are set such that the first current addition value of the slave DC/DC converter in a predetermined stage is equal to the second current addition value of the slave DC/DC converter in the next stage, from the slave DC/DC converter which is far from the master DC/DC converter to the slave DC/DC converter which is near the master DC/DC converter; and a current which is detected from a terminal Isink of the master DC/DC converter is set so as to vary depending on the number of operating converters.

4. The DC/DC converter according to claim 1, wherein the control circuit performs PWM modulation on a switching synchronizing clock on the basis of the information indicating the detected number of operating converters and transmits the switching synchronizing clock to the slave DC/DC converter.

5. A switching power supply device comprising:

a plurality of the DC/DC converters according to claim 1 that are connected in parallel to each other.

6. An electronic apparatus comprising:

the switching power supply device according to claim 5.

* * * * *